United States Patent [19]
O'Sullivan et al.

[11] Patent Number: 5,796,550
[45] Date of Patent: Aug. 18, 1998

[54] METHOD AND APPARATUS FOR PROVIDING DIVERGING RAIL EDGE GEOMETRY FOR AIR BEARING SLIDER

[75] Inventors: Timothy C. O'Sullivan; Laurence S. Samuelson, both of San Jose; Howell B. Schwartz, San Diego, all of Calif.

[73] Assignee: International Business Machines Corporation, Armonk, N.Y.

[21] Appl. No.: 731,606

[22] Filed: Oct. 16, 1996

[51] Int. Cl.⁶ .................................................. G11B 5/60
[52] U.S. Cl. .................................................. 360/103
[58] Field of Search .................................................. 360/103

[56] References Cited

U.S. PATENT DOCUMENTS

| | | | |
|---|---|---|---|
| 4,870,519 | 9/1989 | White | 360/103 |
| 4,893,204 | 1/1990 | Yamada et al. | 360/103 |
| 5,309,303 | 5/1994 | Hsia et al. | 360/103 |
| 5,345,353 | 9/1994 | Krantz et al. | 360/103 |
| 5,430,591 | 7/1995 | Takeuchi et al. | 360/103 |
| 5,532,890 | 7/1996 | Dorius et al. | 360/103 |
| 5,550,692 | 8/1996 | Crane | 360/103 |
| 5,583,722 | 12/1996 | Dorius et al. | 360/103 |
| 5,624,581 | 4/1997 | Ihrke et al. | 360/103 |

FOREIGN PATENT DOCUMENTS 53-29170 3/1978 Japan.
4-17176 1/1992 Japan.

*Primary Examiner*—John H. Wolff
*Attorney, Agent, or Firm*—Merchant, Gould, Smith, Edell, Welter & Schmidt, P.A.

[57] ABSTRACT

A diverging rail edge geometry for an air bearing slider. The air bearing slider provides reduced sensitivity to skew and roll static attitude without contributing to significant increases in cost and complexity. A support structure is formed with an air bearing surface having at least one air bearing rail, pad or other structure disposes thereon. The air bearing pad or rail is formed having at least one edge diverging from the side edges of the support structure. The edges of the rails may also be curved.

42 Claims, 4 Drawing Sheets

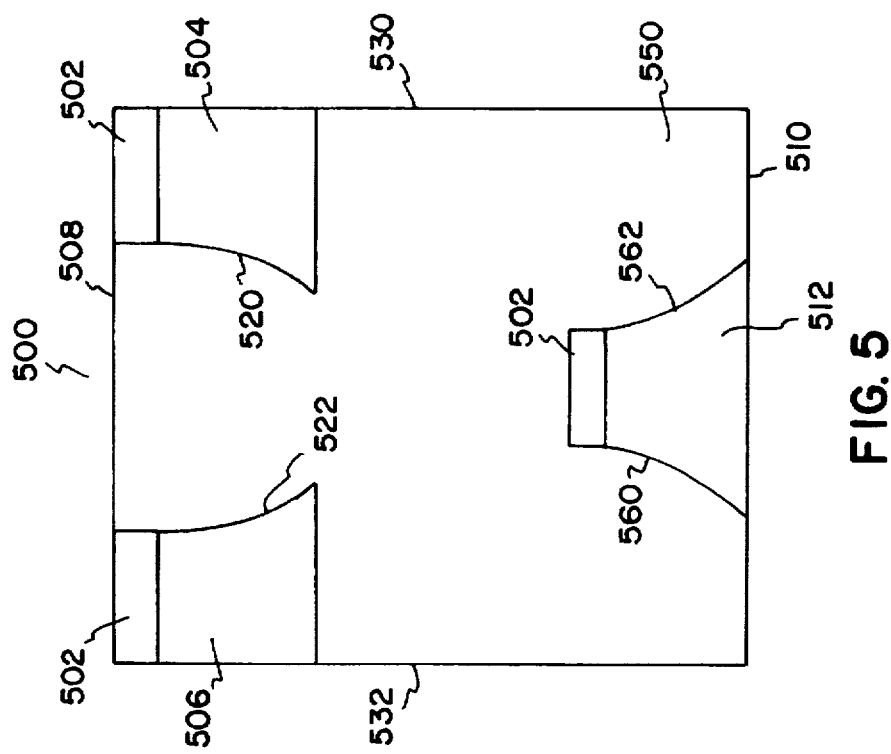
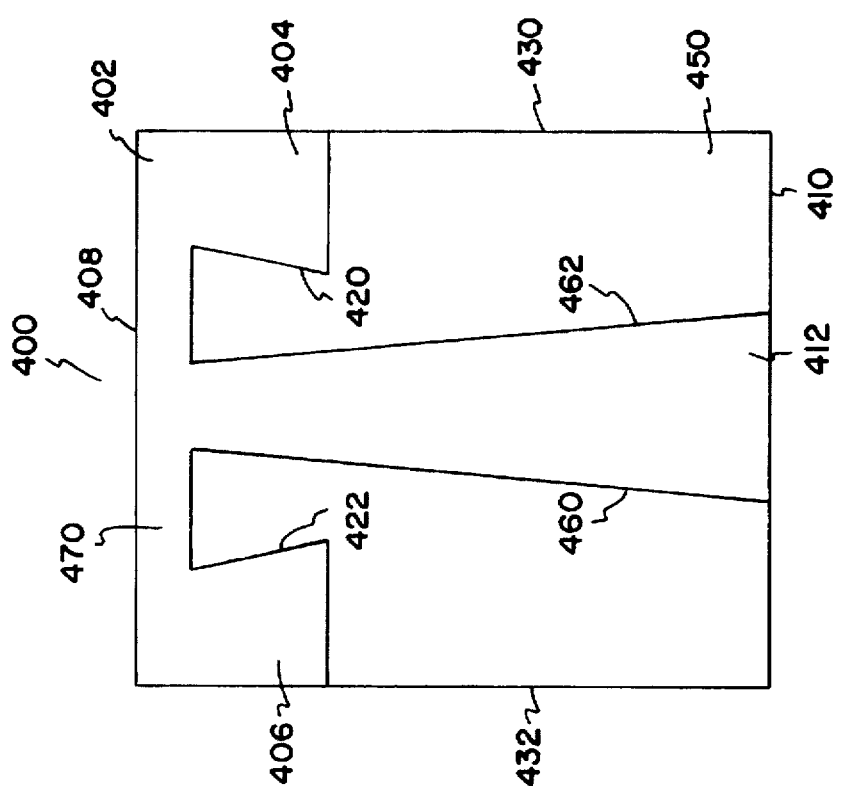

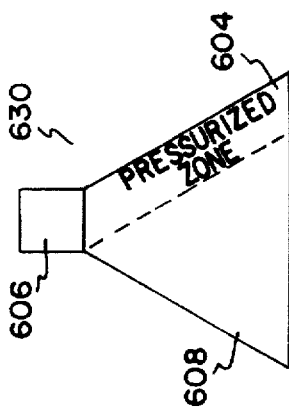
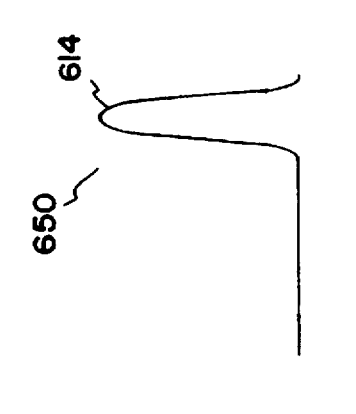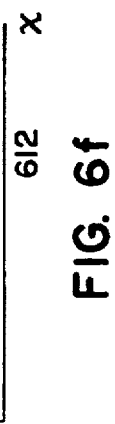
FIG. 6e
FIG. 6f
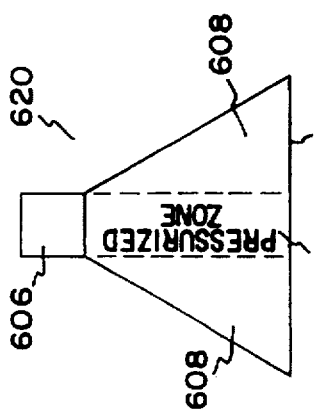
FIG. 6c
FIG. 6d
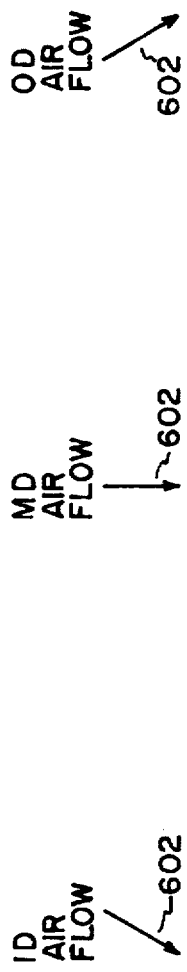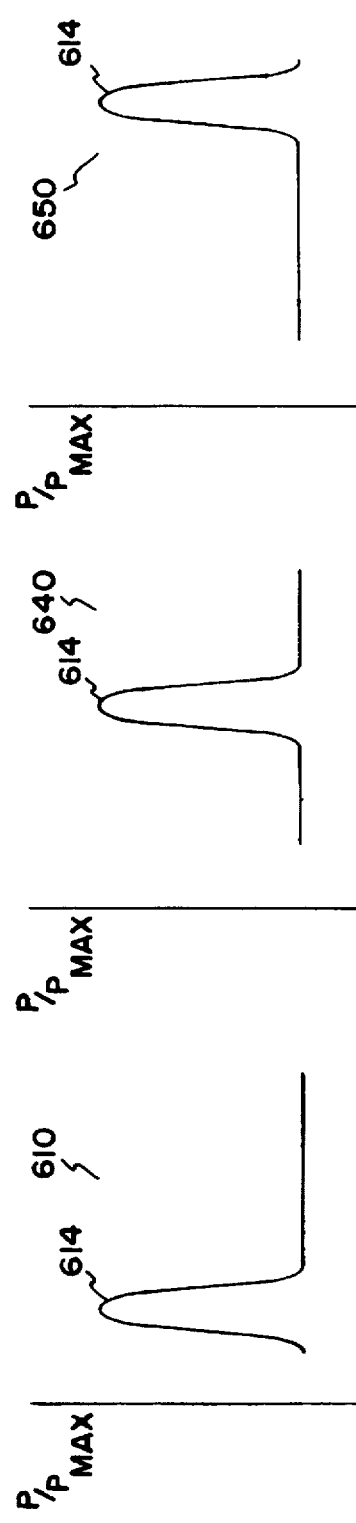
FIG. 6a
FIG. 6b

METHOD AND APPARATUS FOR PROVIDING DIVERGING RAIL EDGE GEOMETRY FOR AIR BEARING SLIDER

BACKGROUND OF THE INVENTION

1. Field of the Invention.

This invention relates in general to air bearing sliders, and more particularly, to a diverging rail edge geometry for air bearing sliders.

2. Description of Related Art

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

In magnetic recording technology, it is continually desired to improve the areal density at which information can be recorded and reliably read. Because the recording density of a magnetic disk drive is limited by the distance between the transducer and the magnetic media, a goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

One improvement in magnetic disk drive technology involves zone bit recording. Zone bit recording is an advanced media optimization technique where the number of sectors per track is dependent upon the cylinder circumference, e.g., tracks on the outside cylinders have more sectors per track than the inside cylinders, but each sector contains the same number of bytes of data.

Zone bit recording can provide significant performance and capacity improvements in magnetic disk storage files. However, in order to facilitate this technology, it is desirable for the air bearing slider to maintain a constant spacing between the read/write head and the disk across all the zones, from the inner-diameter (ID) radius to the outer-diameter (OD) radius of the disk. This presents a key technical challenge, since the air velocity created by the rotating disk varies in both magnitude and direction relative to the slider at all radii. Again, the situation is further exacerbated in files with rotary actuators, as the slider skew angle is varied across the ID-OD data band.

Thus, in addition to achieving a small average spacing between the disk and the transducer, it is critical that a slider fly at a relatively constant height despite the large variety of conditions it experiences during the normal operation of a disk drive. If the flying height is not constant, the data transfer between the transducer and the recording medium may be adversely affected. It is also essential that variations in the physical characteristics of the slider, due to manufacturing tolerances, not substantially alter the flying height of the slider. If this result is not achieved, the slider's nominal fly height must be increased to compensate for variations between sliders.

An example of a parameter that can vary during normal operation of a disk drive is the radial position of a slider with respect to the rotating disk. The flying height of a slider is affected as the actuator arm is moved radially to access different data tracks. This is due to differences in the linear velocity of the disk at differing radii. In effect, the air bearing slider flies at different speeds at differing radii. Because a slider typically flies higher as velocity increases, there is a tendency for sliders to fly higher at the outer diameter of the disk. Disk drives and sliders must be designed to minimize this effect.

A slider also experiences changes in flying height due to variations in skew. Skew is a measure of the angle formed between the longitudinal axis of the slider and the direction of disk rotation as measured in a plane parallel to the disk. Skew varies in a rotary actuator disk drive as the suspension and attached slider move in an arcuate path across the disk. Skew also varies, to a lesser degree, in a linear actuator disk drive when a resiliently mounted slider moves in response to forces exerted upon it. In addition, skew is a concern due to manufacturing tolerances that may cause a slider to be mounted with a permanent, non-zero skew. For sliders mounted to either type of actuator, non-zero skew values result in a slider being pressurized at a reduced value and therefore flying lower. For this reason, it is important that a slider be relatively insensitive to variations in skew.

A slider also experiences fly height variations due to roll. For a slider with zero skew relative to disk rotation, roll is a measure of the angle of rotation about the longitudinal axis of the slider. Variations in roll occur when a resiliently mounted slider experiences a skewed air flow or the actuator impacts the disk. Insensitivity to roll variations is a crucial requirement of air bearing sliders.

Variations in the crown of a slider can also lead to variations in fly height. Crown is a measure of the concave or convex bending of the slider along its longitudinal axis. Crown develops in sliders because of surface stresses that arise during the fabrication and suspension bonding processes. These stresses are not well controlled and therefore lead to sliders with relatively large variations in crown. Also, an individual slider can experience variations in its crown due to temperature variations that occur during the normal operation of a recording disk drive. For these reasons, it is important that the flying height of a slider not vary substantially as a result of variations in crown. Furthermore, a slider with a non-zero crown is the equivalent of a flat slider flying over a disk having small amplitude, long wavelength undulations. Therefore, since all disks have some degrees of waviness, a slider that is less sensitive to variations in crown is also less sensitive to imperfections in the flatness of the recording disk it is flying over.

Finally, a slider experiences varying conditions during the high speed radial movement of the actuator as it accesses data on various portions of the disk. High speed movement across the disk can lead to large values of slider roll and skew and a resultant variation in fly height. This is yet another reason that a slider must be insensitive to changes in roll and skew.

When any of the above described variations in fly height occur, they may result in contact between the slider and the rapidly rotating recording medium. Any such contact leads to wear of the slider and the recording surface and is potentially catastrophic. Prior art slider designs have attempted to avoid this problem by addressing one or more of above described sensitivities, so as to produce a slider with uniform flying height under the varying conditions that may be experienced by the slider. However, air bearing surface geometries which can achieve the required insensitivity to the varying velocity and skew ranges are necessarily complex. And as the overall slider dimensions are reduced from nano to pico sizes and smaller to facilitate cost and productivity gains, the slider air bearing surface (ABS) features must also be proportionately scaled.

Additional solutions to this problem have been proposed and documented. Taper-flat sliders can be skewed relative to the suspension to try to minimize their sensitivity, although this creates difficulties in the assembly process. The transverse pressurization contour (TPC) slider is designed with tapers or steps along the side of the rails to give extremely flat profiles. For example, U.S. Pat. No. 4,870,519, issued to James W. White, entitled "UNIFORM FLYING HEIGHT SLIDER ASSEMBLY WITH IMPROVED DYNAMIC AIR BEARING CHARACTERISTICS", which is incorporated by reference herein, discloses providing at least on longitudinal transverse pressurization contour along the edges of the rails of the slider. The TPC provides improved stability and uniformity of flying height and increased damping characteristics when the slider is subjected to dynamic forces. Nevertheless, this type of slider requires multiple etch depths and tight process controls which ultimately add cost.

Thus, it can be seen then that there is a need for an air bearing slider design which can provide reduced sensitivity to skew without contributing to significant increases in cost and complexity.

It can also be seen that there is a need for an air bearing slider design which can provide reduced sensitivity to roll static attitude.

SUMMARY OF THE INVENTION

To overcome the limitations in the prior art described above, and to overcome other limitations that will become apparent upon reading and understanding the present specification, the present invention discloses a diverging rail edge geometry for an air bearing slider.

The present invention solves the above-described problems by providing an air bearing slider design which can provide reduced sensitivity to skew and roll static attitude without contributing to significant increases in cost and complexity.

A system in accordance with the principles of the present invention includes a support structure and an air bearing surface disposed on the support structure having at least one pad, rail or other air bearing structure with an edge diverging from the side edges of the support structure.

One aspect of the present invention is that the air bearing surface includes two front pads, one disposed on each side of the support structure substantially at the leading edge.

Another aspect of the present invention is that the two front pads each have an inner edge relative to the side edges that diverges from the side edges of the support structure.

Another aspect of the present invention is that the air bearing surface further comprises a pad centrally disposed substantially at the trailing edge of the support structure Another aspect of the present invention is that the air bearing slider may include a cross rail disposed transverse to the longitudinal axis of the slider which couples the two front pads.

Another aspect of the present invention is that the edges of the pads may be curved.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates another exemplary air bearing slider according to the present invention having the center pad connected to a cross rail;

FIG. 5 illustrates another exemplary air bearing slider according to the present invention having curved edges; and FIGS. 6a–f illustrate the air flow at different diameters for a diverging rail pad and the normalized pressure contours associated herewith.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an air bearing slider design which can provide reduced sensitivity to skew and roll static attitude without contributing to significant increases in cost and complexity.

Figure 1:
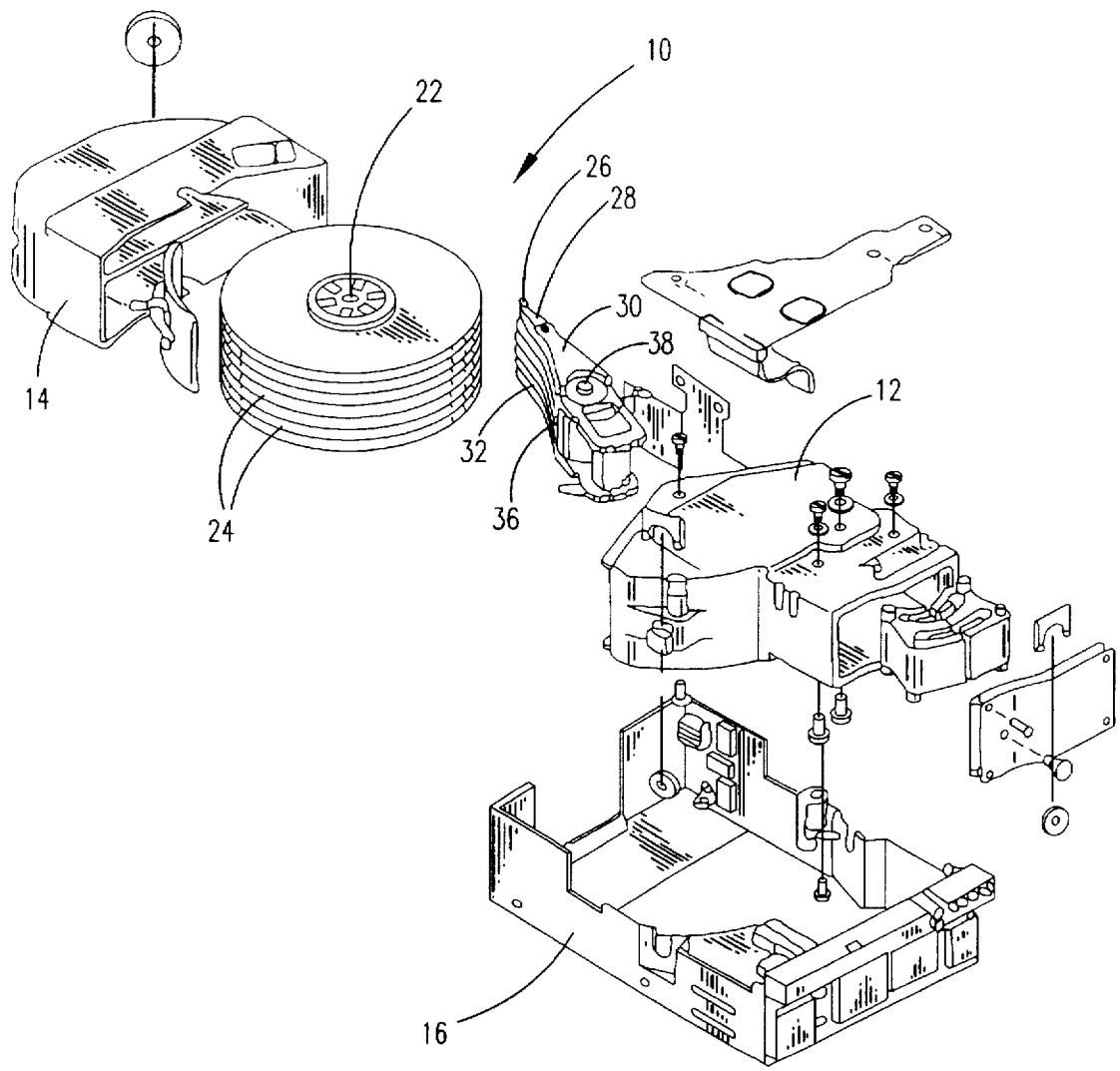
FIG. 1 is an exploded view of a disk drive according to the present invention.

FIG. 1 is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor (not shown). Information is written on or read from the disks 124 by heads or magnetic transducers (not shown) which are supported by sliders 126. Preferably, sliders in accordance with the invention are coupled to the suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138. However, the invention is not meant to be limited to the disk drive described above.

Figure 2:
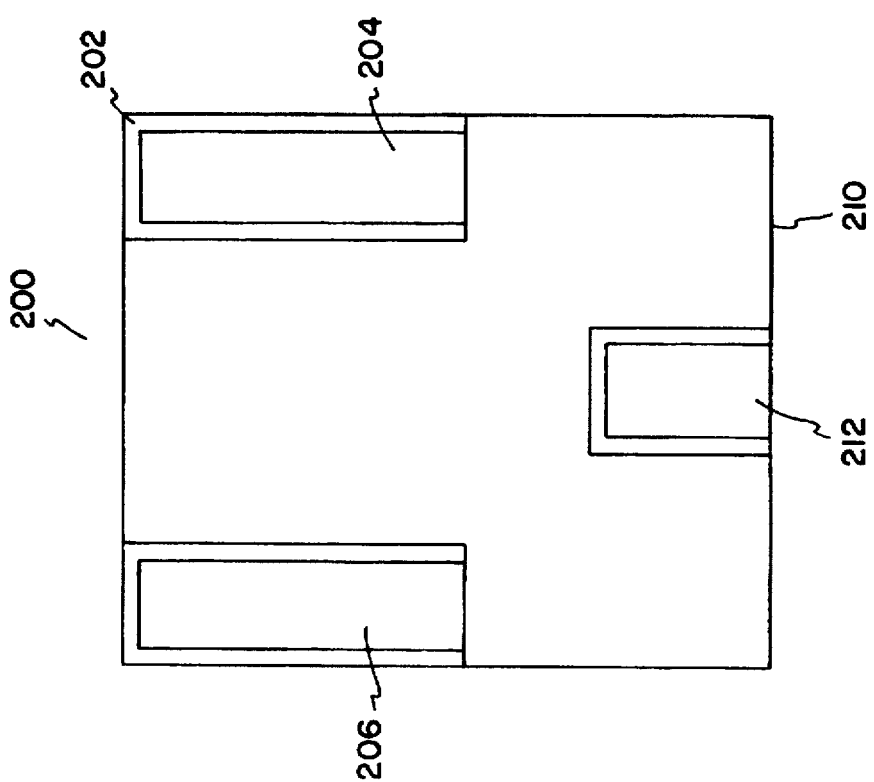
FIG. 2 illustrates a prior art slider having shallow etch contours.

FIG. 2 illustrates a prior art slider 200 having shallow etch contours 202. In the particular prior art embodiment 200 illustrated in FIG. 2, two air bearing pads 204, 206 are formed at the leading edge 208 of the air bearing slider 200. At substantially the trailing edge 210 a central pad 212 is disposed. Each of the pads 204, 206, 212 exhibit a shallow etch 202 around the air bearing surface. However, each of the pads 204, 206, 212 is generally rectangular as conventionally found in the prior art.

Figure 3:
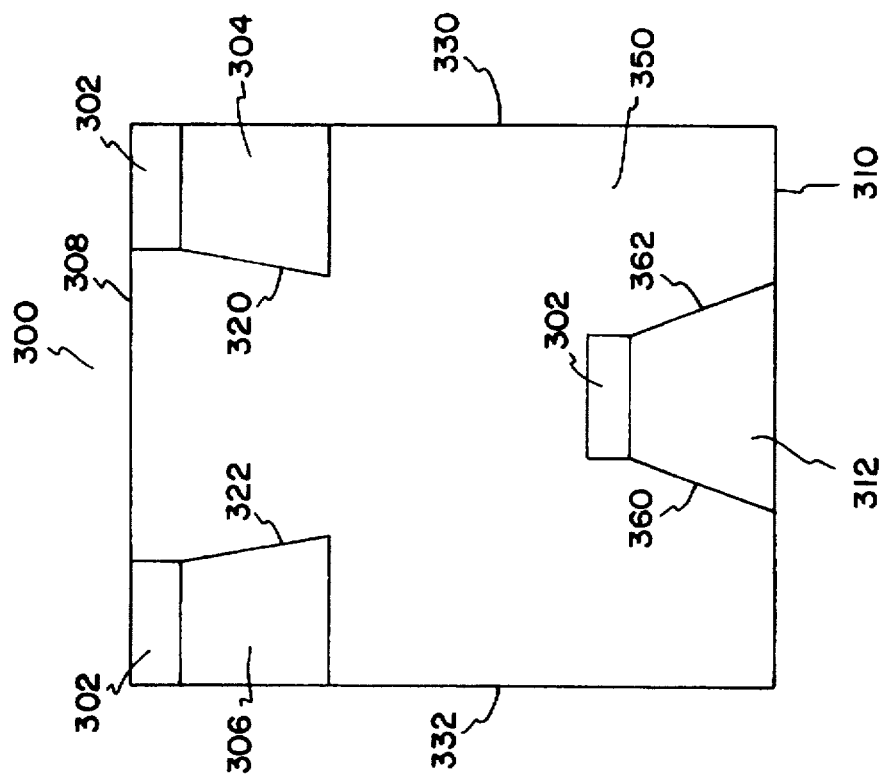
FIG. 3 illustrates an exemplary air bearing slider having a diverging edge geometry according to the present invention.

FIG. 3 illustrates an exemplary air bearing slider 300 according to the present invention. The slider 300 illustrated in FIG. 3 is similar to the slider design illustrated in FIG. 2. However, FIG. 3 illustrates a shallow etch step compression zone 302 at the leading edge of each pad 304, 306, 312. Further, the two front pads 304, 306, each have a inner edge flare 320, 322 which forms a diverging rail geometry with respect to the sides 330 of the slider support structure 350. The central trailing pad 312 includes flared rails 360, 362 on both sides which diverge with respect to the sides 330, 332 of the slider support structure 350.

The diverging rail geometry for the trailing edge pad 312 is selected to reduce skew sensitivity, i.e. variations in fly height caused by the orientation of the slider body changing with respect to the direction of air flow caused by the moving recording medium. The diverging region for the trailing pad 312 is downstream of the associated compression zone at the leading edge of the slider 300. Consequently, the pressure build up resulting from the trailing edge pad 312 occurs colinearly with the direction of air flow under skewed conditions. Furthermore, the diverging rail geometry for the front pads 304, 306 is selected to reduce roll static attitude sensitivity, i.e., static attitude bias induced by the suspension. The diverging regions for the front pads 304, 306 increase the resisting moment exhibited by the slider during skewed conditions and thereby decrease the roll static attitude sensitivity. Accordingly, those skilled in the art will recognize that the number of pads and the specific diverging edge geometries are not limited to those disclosed above, but may be selected in consonance with the conditions exhibited by the storage device to yield less sensitivity to skew angles.

FIG. 4 illustrates another exemplary air bearing slider 400 according to the present invention having a center pad 412 with diverging edge geometry connected to a cross rail 470. In FIG. 4, two front pads 404, 406 are coupled by the cross rail 470. Again, the two front pads 404, 406 each have a flared inner rail edge 420, 422 to form the diverging rail geometry with respect to the sides 430, 432 of the slider support structure 450. A further distinguishing characteristic of FIG. 4 includes the central rail 412 which is coupled to the cross rail 470 generally at the leading edge 408 of the slider 400 and extends substantially to the trailing edge 410 of the slider 400. The edges 460, 462 of the central rail 412 are both diverging according to the invention.

FIG. 5 illustrates another exemplary air bearing slider 500 according to the present invention wherein the diverging edge geometry includes curved edges. The slider 500 illustrated in FIG. 5 is similar to the slider illustrated with reference to FIG. 3. Again, the two front pads 504, 506 and the trailing central pad 512 include flared edges 520, 522, 560, 562 to form the diverging rail geometry. However, in FIG. 5 the edges 520, 522, 560, 562 of the diverging edges are not straight, but rather include curvature.

The exemplary sliders described above have been provided to demonstrate diverging rail geometries according to the invention. However, those skilled in the art will recognize that while sliders with two front pads and one generally rear pad have been described, any number of such step compression-diverging rail features can be used without departing from the invention. As illustrated with reference to FIG. 5, the diverging rail geometry may include curved edges, and with reference to FIG. 4, the trailing diverging rail section may be an extension of a cross rail. Furthermore, the step compression zone itself may be implemented as a taper. Accordingly, the trailing center pad reduces skew sensitivity by allowing the pressure buildup to occur co-linearly with the direction of flow under skewed conditions, and the diverging geometry of the front pads reduce the role static attitude sensitivity under skewed conditions.

FIGS. 6a–f illustrate the air flow at different diameters for a diverging rail pad and the normalized pressure contours associated therewith. FIG. 6a shows a diverging rail pad 600 with a leading edge step taper under inner-diameter conditions. The air flow direction 602 is skewed relative to the pad 600 due to the rotary actuator. The air pressurization zone 604 on the diverging rail pad 600 is limited to a region immediately downstream from the shallow etch compression 606. Areas on the pad away from this zone 608 do not pressurize and therefore do not contribute to the air bearing. FIG. 6b shows the normalized pressure contour 610 taken along the trailing edge width 612 of the pad 600. The pressure peak 614 is shifted toward the air flow skew 604, while the remaining portion of the pad 608 remains at or near ambient conditions. FIGS. 6c and 6e show the same pad at the middle-diameter 620 and outer-diameter 630 conditions respectively. In each case, the pressurized region 604 pivots across the width 612 of the pad to remain immediately downstream of the step 606. FIGS. 6d and 6f illustrate how the trailing edge pressure contours 640, 650 move along with the pressurized region 604 as the air flow 602 skews, and how the zones not downstream 608 of the step do not pressurize and thus remain near ambient.

Accordingly, the diverging pad geometry provides a pressurization zone 604 to support the air bearing under skewed conditions. The effectiveness of this zone 604 can be controlled by adjusting the angle of the diverging rail geometry 660, i.e., flare. High air bearing loads can be generated by using a flare 660 such that the edge 662 of the pad roughly follows the air flow direction 602 in the skewed condition. Using a narrower flare angle 660 induces pressure leakage along the pad edge 662, and reduces the load bearing capacity. Thus, the slider flying height can be controlled by balancing the flare angle leakage against the air pressure created by the disk rotation. By adjusting the inner-diameter and outer-diameter flare angles, the compression step geometry, and the pad size, a more constant flying height can be achieved at all disk radii.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An air bearing slider for supporting a transducer over a moving recording medium, the slider having side edges, a leading and a trailing edge relative to the motion of the recording medium, and a longitudinal axis disposed along the length of the slider from the leading edge to the trailing edge, the slider further comprising at least one air bearing surface pad, wherein each air bearing surface pad includes a step compression zone portion and a flared rail portion, and wherein the flared rail portion comprises at least one side rail having a proximal end at the step compression zone portion and a distal end opposite thereto, the at least one side rail diverging form the longitudinal axis of the slider continually from the proximal end to the distal end.

2. The air bearing slider of claim 1 wherein the at least one air bearing surface pad comprises two front pads, one disposed on each side of the slider substantially at the leading edge.

3. The air bearing slider of claim 2 wherein the two front pads each have an inner edge, the inner edge of each front pad diverging from the side edges of the slider.

4. The air bearing slider of claim 3 wherein the at least one air bearing surface pad further comprises a trailing edge pad centrally disposed substantially at the trailing edge of the slider.

5. The air bearing slider of claim 4 wherein the trailing edge pad further comprises side edges, the side edges being curved.

6. The air bearing slider of claim 1 wherein the at least one air bearing surface pad comprises a trailing edge pad centrally disposed substantially at the trailing edge of the slider.

7. The air bearing slider of claim 6 wherein the trailing edge pad further comprises side edges, the side edges being curved.

8. The air bearing slider of claim 1 wherein the at least one air bearing surface pad comprises two front pads disposed on each side of the slider substantially at the leading edge, the air bearing slider further comprising a cross rail disposed transverse to the longitudinal axis and coupling the two front pads.

9. The air bearing slider of claim 8 wherein the two front pads each have an inner edge, the inner edge of each front pad diverging from the side edges of the slider.

10. The air bearing slider of claim 9 wherein the at least one air bearing surface pad further comprises a center pad centrally disposed and extending from the cross rail to substantially the trailing edge of the slider.

11. The air bearing slider of claim 10 wherein the centrally disposed center pad further comprises side edges, the side edges being curved.

12. The air bearing slider of claim 9 wherein the at least one air bearing surface pad further comprises a trailing edge pad centrally disposed substantially at the trailing edge of the slider.

13. The air bearing slider of claim 12 wherein the trailing edge pad further comprises side edges, the side edges being curved.

14. The air bearing slider of claim 1 wherein the edge of the at least one air bearing surface pad is curved.

15. A disk drive apparatus for recording data, comprising:
   at least one rotating disk for recording data thereon;
   a housing, the rotatable disk being rotatably attached to the housing;
   an actuator arm assembly, coupled to the housing;
   a slider, attached to the actuator arm assembly proximate to the recording surface such that the slider can be selectively positioned over the surface of the rotating disk, the slider further comprising side edges, a leading and
   a trailing edge relative to the motion of the recording medium, and a longitudinal axis disposed along the length of the slider from the leading edge to the trailing edge, the slider further comprising at least one air bearing surface pad, wherein each air bearing surface pad includes a step compression zone portion and a flared rail portion, and wherein the flared rail portion comprises at least one side rail having a proximal end at the step compression zone portion and a distal end opposite thereto, the at least one side rail diverging form the longitudinal axis of the glider continually from the proximal end to the distal end.

16. The disk drive apparatus of claim 15 wherein the at least one air bearing surface pad comprises two front pads, one disposed on each side of the slider substantially at the leading edge.

17. The disk drive apparatus of claim 16 wherein the two front pads each have an inner edge, the inner edge of each front pad diverging from the side edges of the slider.

18. The disk drive apparatus of claim 17 wherein the at least one air bearing surface pad further comprises a trailing edge pad centrally disposed substantially at the trailing edge of the slider.

19. The disk drive apparatus of claim 18 wherein the trailing edge pad further comprises side edges, the side edges being curved.

20. The disk drive apparatus of claim 15 wherein the at least one air bearing surface pad comprises a trailing edge pad centrally disposed substantially at the trailing edge of the slider.

21. The disk drive apparatus of claim 20 wherein the trailing edge pad further comprises side edges, the side edges being curved.

22. The disk drive apparatus of claim 15 wherein the at least one air bearing surface pad comprises two front pads disposed on each side of the slider substantially at the leading edge, the air bearing slider further comprising a cross rail disposed transverse to the longitudinal axis and coupling the two front pads.

23. The disk drive apparatus of claim 22 wherein the two front pads each have an inner edge, the inner edge of each front pad diverging from the side edges of the slider.

24. The disk drive apparatus of claim 23 wherein the at least one air bearing surface pad further comprises a center pad centrally disposed and extending from the cross rail to substantially the trailing edge of the slider.

25. The disk drive apparatus of claim 24 wherein the centrally disposed center pad further comprises side edges, the side edges being curved.

26. The disk drive apparatus of claim 23 wherein the at least one air bearing surface pad further comprises a trailing edge pad centrally disposed substantially at the trailing edge of the slider.

27. The disk drive apparatus of claim 26 wherein the trailing edge pad further comprises side edges, the side edges being curved.

28. The disk drive apparatus of claim 15 wherein the edge of the at least one air bearing surface pad is curved.

29. A method for making an air bearing slider for supporting a transducer over a moving recording medium, comprising the steps of:
   forming a slider having side edges, a leading and a trailing edge relative to the motion of the recording medium, and a longitudinal axis disposed along the length of the slider from the leading edge to the trailing edge; and
   forming at least one air bearing surface pad on the slider facing the moving recording medium, the air bearing surface pad includes a step compression zone portion and a flared rail portion, and wherein the flared rail portion comprises at least one side rail having a proximal end at the step compression zone portion and a distal end opposite thereto, the at least one side rail diverging form the longitudinal axis of the slider continually from the proximal end to the distal end.

30. The method of claim 29 wherein the step of forming the at least one air bearing surface pad further comprises the step of forming two front pads, one disposed on each side of the slider substantially at the leading edge.

31. The method of claim 30 wherein the two front pads each have an inner edge, the inner edge of each front pad diverging from the side edges of the slider.

32. The method of claim 31 wherein the step of forming the at least one air bearing surface pad further comprises the step of forming a trailing edge pad centrally disposed substantially at the trailing edge of the slider.

33. The method of claim 32 wherein the step of forming the trailing edge pad further comprises the step of forming side edges on the trailing edge pad, the side edges being curved.

34. The method of claim 29 wherein the step of forming the at least one air bearing surface pad comprises the step of forming a trailing edge pad centrally disposed substantially at the trailing edge of the slider.

35. The method of claim 34 wherein the step of forming the trailing edge pad further comprises the step of forming side edges on the trailing edge pad, the side edges being curved.

36. The method of claim 29 further comprising the step of forming a cross rail disposed transverse to the longitudinal axis, and wherein the step of forming the at least one air bearing surface pad comprises the step of forming two front pads disposed on each side of the slider substantially at the leading edge, the cross rail coupling the two front pads.

37. The method of claim 36 wherein the two front pads each have an inner edge, the inner edge of each front pad diverging from the side edges of the slider.

38. The method of claim 37 wherein the step of forming the at least on air bearing surface pad further comprises the step of forming a center pad centrally disposed and extending from the cross rail to substantially the trailing edge of the slider.

39. The method of claim 38 wherein the step of forming the centrally disposed center pad further comprises the step of forming side edges on the centrally disposed rail, the side edges being curved.

40. The method of claim 37 wherein the step of forming the at least one air bearing surface pad further comprises the step of forming a trailing edge pad centrally disposed substantially at the trailing edge of the slider.

41. The method of claim 40 wherein the step of forming the trailing edge pad further comprises the step of forming side edges on the trailing edge pad, the side edges being curved.

42. The method of claim 29 wherein the method of forming the at least one air bearing surface pad further comprises the step of forming a curved edge on the air bearing surface.

* * * * *